United States Patent [19]
Chamberlin

[11] 3,990,030
[45] Nov. 2, 1976

[54] PINCUSHION CORRECTION TRANSFORMER

[75] Inventor: Edward R. Chamberlin, Loveland, Ohio

[73] Assignee: Standex International Corporation, Andover, Mass.

[22] Filed: Aug. 11, 1975

[21] Appl. No.: 603,536

[52] U.S. Cl. ............................... 336/65; 315/370; 336/171; 336/178; 336/181; 336/182; 336/192
[51] Int. Cl.² ...................................... H01F 27/30
[58] Field of Search ........... 336/171, 170, 180, 181, 336/182, 184, 155, 160, 65, 178, 145, 146, 147, 192; 315/370, 371, 400, 405; 323/44, 45

[56] References Cited
UNITED STATES PATENTS

| | | |
|---|---|---|
| 3,329,861 | 7/1967 | Barkow et al. ...................... 315/370 |
| 3,914,652 | 10/1975 | Valkestijn ........................... 315/371 |

FOREIGN PATENTS OR APPLICATIONS

| | | | |
|---|---|---|---|
| 347,538 | 4/1931 | United Kingdom ................. | 336/147 |

*Primary Examiner*—Thomas J. Kozma
*Attorney, Agent, or Firm*—Weingarten, Maxham & Schurgin

[57] ABSTRACT

For use in the deflection circuitry of a cathode ray tube, such as with a television receiver picture tube, a single pincushion correction transformer providing both vertical and horizontal correction. The transformer includes an E core having a control winding provided around the central leg, a horizontal correction winding provided on one outer leg and a pair of phase opposed windings on the other leg to minimize cross modulation and sensitivity to stray magnetic fields.

10 Claims, 5 Drawing Figures

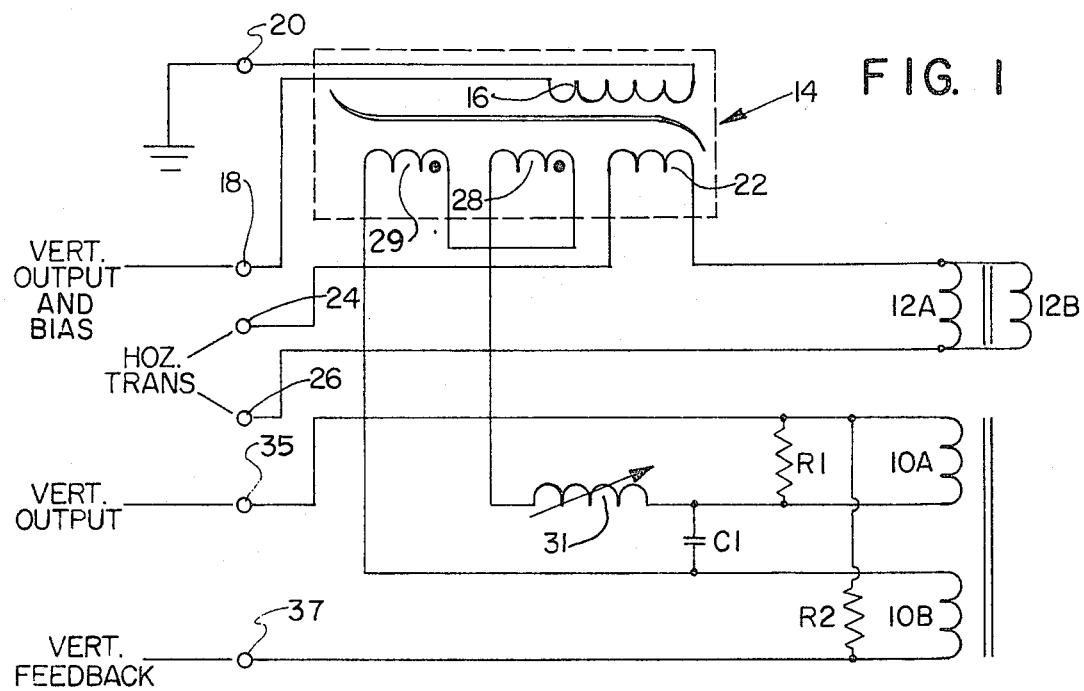
FIG. 1
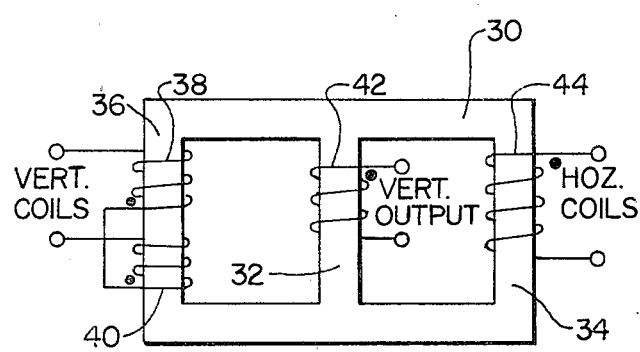
FIG. 2
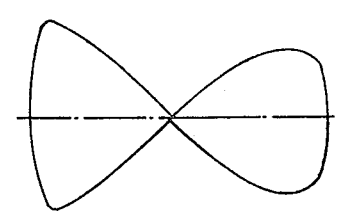
FIG. 3
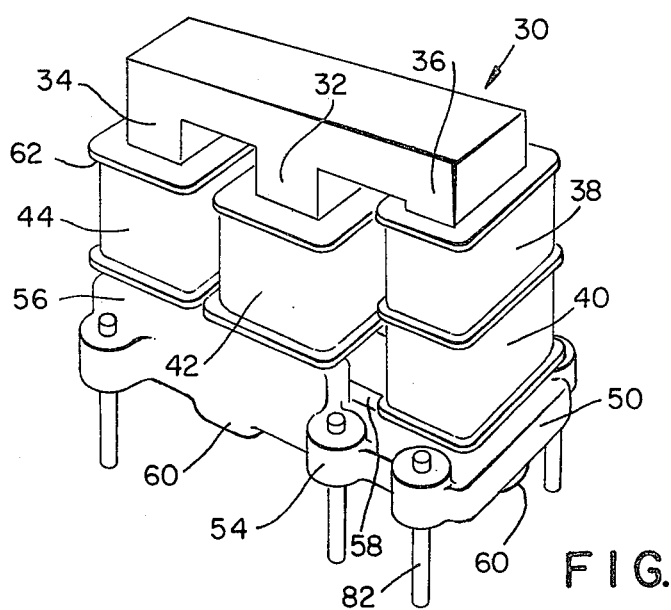
FIG. 4
FIG. 5

PINCUSHION CORRECTION TRANSFORMER

FIELD OF THE INVENTION

This invention relates to transformers and more particularly to a pincushion correction transformer for use in cathode ray tube deflection circuits.

BACKGROUND OF THE INVENTION

In the deflection of an electron beam of a cathode ray tube, such as a television picture tube, deflection errors occasioned by the geometry of the tube and the electron optics of the scanned beam result in pincushion distortion by which an image appearing on the tube screen has inwardly curved top, bottom and side edges with the image being correspondingly inwardly compressed. Such pincushion distortion is corrected by appropriate adjustment of the horizontal and vertical deflection signals applied to the cathode ray tube and which compensates for the deflection error. Deflection signal compensation has generally been accomplished by use of two separate correction transformers, one for horizontal or side-to-side correction, and the other for vertical or top-to-bottom correction. Such individual transformers must be separately fabricated and individually wired into the associated deflection circuits of the cathode ray tube which must physically accommodate both transformers. Provision of both horizontal and vertical deflection correction in a single transformer structure would be useful, and according to a known single transformer construction, a vertical deflection winding is provided around the outside of a transformer core with this winding being physically orthogonal to the other windings provided around legs of the transformer core. This transformer construction is, however, quite sensitive to stray magnetic fields and to its physical positioning with respect to the deflection yoke or other transformers and requires coil alignment during its fabrication.

SUMMARY OF THE INVENTION

Briefly, the present invention provides a unitary pincushion correction transformer providing both horizontal and vertical pincushion correction and which is readily incorporated into the deflection circuitry of an associated cathode ray tube, as in a television receiver, without criticality of installation position. In preferred embodiment, the novel pincushion correction transformer includes an E core having a pair of phase opposed windings on one outer leg of the core for providing vertical correction, a horizontal correction winding on the other outer leg of the core and a control winding on the center leg of the core. The pair of windings providing vertical correction are of equal and opposite phase such that the total induced voltage is zero, thus producing no cross modulation between the vertical and horizontal correction windings. The inductance of the phase opposed windings is a function of the mutual coupling between the two coils and the incremental permeability of the transformer core. Stray magnetic fields from other components have relatively little effect on the performance of the novel transformer. The novel transformer is readily fabricated without requirement for critical alignment and is relatively immune to manufacturing variations in the core gap.

DESCRIPTION OF THE DRAWINGS

The invention will be more fully understood from the following detailed description taken in conjunction with the accompanying drawings in which:

FIG. 1 is a schematic representation of a portion of the deflection circuit of a cathode ray tube including the novel transformer;

FIG. 2 is a schematic representation of the novel pincushion correction transformer;

FIGS. 3 and 4 are waveforms of the signals provided by the novel transformer; and FIG. 5 is an elevation view of the novel transformer in preferred embodiment.

DETAILED DESCRIPTION OF THE INVENTION

Referring to FIG. 1, there is shown a portion of the deflection circuit of a cathode ray tube such as for the picture tube in a television receiver. A pair of vertical deflection coild 10A and 10B and a pair of horizontal deflection coils 12A and 12B are typically supported on a yoke adapted for mounting around the neck of a cathode ray tube. These deflection coils are energized by appropriate deflection signals in well-known manner to provide scanning of the cathode ray tube electron beam and generation of a raster pattern on the tube screen. A single pincushion correction transformer 14 is interconnected with the horizontal and vertical deflection coils to provide both horizontal and vertical pincushion correction from a unitary six terminal transformer structure.

The transformer 14 includes a first winding 16 connected to terminals 18 and 20 which are respectively connected to a drive voltage of vertical scan frequency and appropriate wave shape, typically 5 volts peak to peak, and ground or other reference potential. A second winding 22 has one lead connected to horizontal deflection coils 12A and 12B and the other lead connected to a terminal 24. A terminal 26 is connected to the other lead of the horizontal correction coils 12A and 12B. The terminals 24 and 26 are connected to a horizontal drive transformer as a source of horizontal deflection signals. Transformer 14 also includes third and fourth windings 28 and 29 interconnected in phase opposition and having one lead connected via a phase adjustment coil 31 to one lead of vertical deflection coil 10A, the other lead of which is connected to vertical output terminal 35. The lead of winding 29 is connected to one lead of vertical deflection coil 10B, the other lead of which is connected to vertical feedback terminals 37. A capacitor C1 is connected as shown between coils 10A and 10B. A resistor R1 is connected across coil 10A, while resistor R2 is connected between coils 10A and 10B, these resistors being employed to damp the flyback pulses which can tend to cause ringing of coil 31 and capacitor C1. The network composed capacitor C1, coil 31 and windings 28 and 29 is resonant at the horizontal deflection frequency of 15,750 Hz. The phase of the correction signals is adjusted by coil 31 to achieve uniform corrections along both axes.

The novel transformer is shown schematically in FIG. 2 and includes an E core 30 having a central leg 32 and outer legs 34 and 36. First and second windings 38 and 40 are wound on outer leg 36 and are interconnected in phase opposition to provide a double coil structure providing vertical pincushion correction when connected to the vertical deflection coils of an associated cathode ray tube. A winding 42 is provided around central leg 32 and serves as the control winding for the transformer. A winding 44 is wound around outer leg 34 and serves to provide horizontal pincushion correction when connected with the horizontal deflection coils of the associated cathode ray tube. The windings 38 and 40 are of equal and opposite phase exhibiting a total induced voltage of substantially zero. In the embodiment of FIG. 2, windings 38 and 40 are wound with the same winding sense with the finish lead of winding 38 connected to the finish lead of winding 40 to yield a phase opposed pair of coils. Alternatively, the windings 38 and 40 can be wound of opposite sense and having the finish lead of one connected to the start lead of the other to yield the intended phase opposed coil structure.

With the novel transformer mounted in its normal operating position in a deflection yoke housing and with the usual deflection and energizing signals applied thereto, a vertical correction voltage known as a bow tie voltage is provided across capacitor C1 and is of the form shown in FIG. 3. The horizontal correction current provided by winding 22 of transformer 14 is as shown in FIG. 4. The function of the correction signals to compensate for the pincushion distortion otherwise present in the cathode ray tube is well known in the art and need not be discussed in any detail herein. By virtue of the present invention, both the horizontal and vertical pincushion correction signals are provided by a single transformer structure rather than by separate transformers for each axis of correction.

The transformer is constructed typically as shown in FIG. 5 as a plug-in unit adapted for easy insertion into a circuit board associated with the cathode ray tube deflection circuit. Referring to FIG. 5, the transformer core 30 is of double E construction having a gap between the confronting portions of the core legs, and is supported by a base 50 of insulative material having six electrical leads 52 supported by and depending from the respective flange portions 54 of the base. The gap is preferably at the center of each core leg to provide a symmetrical magnetic structure and is typically 0.002 inch as defined by an interposed spacer. The base 50 includes a raised pedestal portion 56 which defines the mounting position of two of the windings, and a lower pedestal portion 58 which defines the mounting position of the phase opposed windings. Disposed on the bottom of base 50 are protrusions 60, the surfaces furthest removed from the bottom of base 50 defining a mounting surface for the transformer with respect to a circuit board on which the transformer is installed. The windings 38, 40, 42 and 44 are each prewound on a corresponding flanged coil form 61 configured for mounting around respective legs 32, 34 and 36 of transformer core 30.

The coil forms 62 carrying windings 42 and 44 are supported by pedestal portion 56 at a predetermined central position along the length of legs 32 and 34. The coil forms 62 carrying windings 42 and 44 are supported by pedestal portion 56 at a predetermined central position along the length of legs 32 and 34. The coil forms 62 carrying windings 38 and 40 are supported in similar manner by lower pedestal portion 58 to maintain the central position of the phase opposed windings on leg 36. One pair of leads 52 is connected to winding 44, a second pair of leads is connected to winding 42, while the third pair of leads is connected to the interconnected phase opposed windings 38 and 40. The base 50 and coil forms 62 are typically formed of a suitable plastic material. If desired, the entire transformer can be encapsulated or otherwise enclosed for mechanical protection of the windings and isolation of the transformer from dust and other contaminants.

In an alternative construction, the raised pedestal portions 56 and 58 can be eliminated and the coil forms 62 dimensioned such that the entire length of the core legs is substantially occupied by the windings. Thus, windings 42 and 44 would extend along substantially the full length of respective legs 32 and 34, while windings 38 and 40 together would occupy substantially the full length of leg 36.

A typical implementation of the embodiment of FIG. 5 employs an E core approximately 1 in length and height and ¼ inch in width and having the following electrical specifications:

Core

Initial permeability 1,800
Maximum permeability 6,000
Saturation flux density 4,600 Gauss
Residual flux density 1,100 Gauss Winding 42

35 turns of No. 24 AWG
1.0 millihenry
0.1 ohm

Winding 44

3,000 turns of No. 41 AWG
10 millihenries
450 ohms

Windings 38 and 40

115 turns each of No. 30 AWG
15 millihenries each
0.7 millihenry total
2.4 ohms total It will be appreciated that the particular transformer construction and specifications will vary to suit particular electrical requirements of different cathode ray tube deflection circuits. Accordingly, it is not intended to limit the invention by what has been particularly shown and described except as indicated in the appended claims.

What is claimed is:

1. A pincushion correction transformer comprising:
   an E core having a central leg and first and second outer legs, all of said legs being connected in magnetic circuit at their ends only by first and second core segments to define a two window magnetic core;
   a first winding on said first leg;
   a second winding on said first leg connected to said first winding in equal and opposite phase to provide a vertical correction winding;
   first and second electrical terminals coupled to said interconnected first and second windings;
   a third winding around said central leg and serving as a control winding for said transformer;
   third and fourth electrical terminals coupled to said third winding;
   a fourth winding around said second outer leg serving as a horizontal correction winding;
   fifth and sixth electrical terminals connected to said fourth winding.

2. A pincushion correction transformer according to claim 1 wherein said first and second windings each have the same number of turns and the same inductance.

3. A pincushion correction transformer according to claim 1 including:
a base member supporting said core and windings, said base member having a plurality of protrusions depending from said base and defining a mounting surface;
and wherein said electrical terminals include a plurality of electrical leads supported by and depending from said base member.

4. A pincushion correction transformer according to claim 3 wherein said base member further includes a first raised pedestal portion defining the mounting position of said third and fourth windings and a second lower pedestal portion defining the mounting position of said first and second windings.

5. A pincushion correction transformer according to claim 3 wherein said windings are each wound on a corresponding flanged coil form configured for mounting around the respective leg of said core.

6. A pincushion correction transformer according to claim 2 wherein said first and second windings are each of the same winding sense having the finish lead of said first winding connected to the finish lead of said second winding.

7. A pincushion correction transformer according to claim 2 wherein said first and second windings are of opposite winding sense having the finish lead of said first winding connected to the start lead of said second winding.

8. A pincushion correction transformer according to claim 2 including:
a base member and a first surface supporting said core and the windings thereon;
a plurality of protrusions depending from said base member and defining a mounting surface; and
a plurality of electrical leads supported by and depending from said base member along parallel axes substantially orthogonal to said mounting surface; said leads defining said electrical terminals.

9. A pincushion correction transformer according to claim 2 wherein said core is of double E construction having a gap between the confronting portions of the core legs and disposed centrally of each core leg to provide a symmetrical magnetic structure.

10. A pincushion correction transformer according to claim 8 wherein said base member further includes a plurality of flange portions integrally formed with said base member and each supporting a respective one of said electrical leads.

* * * * *